Dec. 12, 1950 R. B. DOME 2,534,111

WAVE CONVERSION SYSTEM FOR TRANSMITTERS AND RECEIVERS

Filed Dec. 10, 1946 2 Sheets-Sheet 1

Inventor:
Robert B. Dome,
by Merton D. Moore
His Attorney.

Inventor:
Robert B. Dome,
by Merton D. Morse
His Attorney.

Patented Dec. 12, 1950

2,534,111

UNITED STATES PATENT OFFICE 2,534,111

WAVE CONVERSION SYSTEM FOR TRANSMITTERS AND RECEIVERS

Robert B. Dome, Bridgeport, Conn., assignor to General Electric Company, a corporation of New York Application December 10, 1946, Serial No. 715,302

11 Claims. (Cl. 178—5.6)

Figure 1:
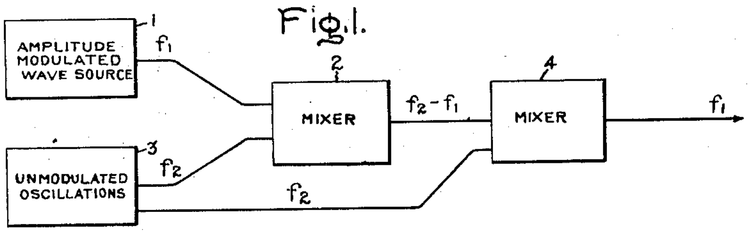

My invention relates to systems for transmitting and receiving high frequency waves and it has for its primary object to provide a new and improved method and means for converting an amplitude modulated wave into a wave essentially free from such modulation.

In my copending application, Serial No. 679,341, filed June 26, 1946, and assigned to the assignee of the present invention, now Patent 2,504,662, issued April 18, 1950, I have disclosed a television receiving system in which a carrier wave modulated in frequency with audio signals is heterodyned with a carrier modulated in amplitude by video signals to obtain a relatively low frequency wave which is frequency modulated with the sound signals. I have found that in such a system when the video modulated carrier wave contains any frequency modulation components, such components are transferred to the lower frequency wave and may appear in the audio signal output circuits as undesired components. Accordingly, it is an object of my present invention to provide a new and improved television transmitter circuit in which a modulated video carrier wave is utilized to provide a sound carrier wave so that the difference frequency of the two carrier waves does not contain unwanted frequency modulations of the video carrier wave.

It is still another object of my invention to provide a new and improved frequency modulation receiver.

Heretofore, it has been customary in the construction of frequency modulation receivers to use intermediate frequency amplifiers having very high gains so that effective limiting can be accomplished with circuits requiring relatively high input voltages. Such amplifiers require extreme care in design in order to avoid introduction of interference or noise due to overall regeneration in the amplifiers. It is an object of my invention to provide a final intermediate frequency amplifying stage which requires only a low level input signal to provide useful output, the level of the input signal being a small fraction of that required in the usual frequency modulation receiver.

A further object of my invention is to provide a new and improved frequency modulation receiver in which suppression of amplitude modulation is effected at low signal levels.

It is a still further object of my invention to provide a new and improved frequency modulation receiver which does not require the interchannel noise suppression circuits usually employed in such receivers.

It is still another object of my invention to provide a new and improved amplitude limiter circuit.

In its broad aspect, my invention consists in heterodyning an amplitude modulated wave with a second wave which has a constant amplitude many times smaller than the minimum amplitude of the amplitude modulated wave. A linear detector is utilized to obtain a difference frequency wave which is essentially free from amplitude modulation.

In another of its aspects, my invention provides a circuit for reverting to the original frequency of the modulated wave by heterodyning the difference frequency with the aforementioned second wave to obtain a constant amplitude wave of the original frequency.

In another of its aspects, my invention utilizes the afore-described system in a television transmitted by heterodyning the video modulated wave in the output of the picture transmitter with constant amplitude oscillations of low level to obtain a beat frequency wave substantially free of amplitude modulations and varying in frequency with any frequency modulations of the video modulated waves. The beat frequency waves are mixed with waves of a frequency equal to the difference in frequency between the picture and sound carrier waves and are modulated in frequency with audio signals. The combined beat and difference frequency waves are, in turn, mixed with waves of the low level oscillations to obtain waves of the frequency of the sound carrier which are modulated in frequency with audio signals.

In still another of its aspects, my invention consists in employing, in the intermediate frequency stage of a frequency modulation receiver, a linear detector to provide amplitude modulation suppression through frequency conversion action, the frequency conversion action being obtained by beating a low level constant amplitude local oscillation with a comparatively strong signal voltage.

Figure 2:
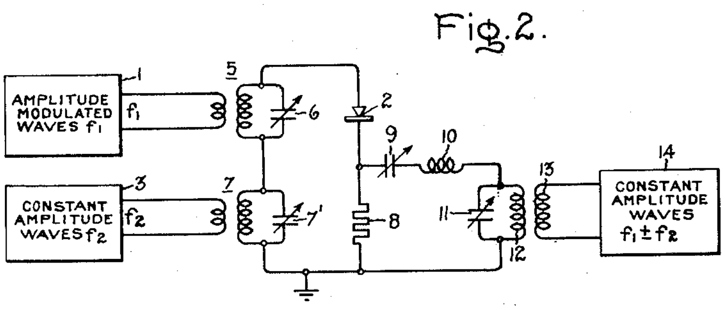
Figure 3:
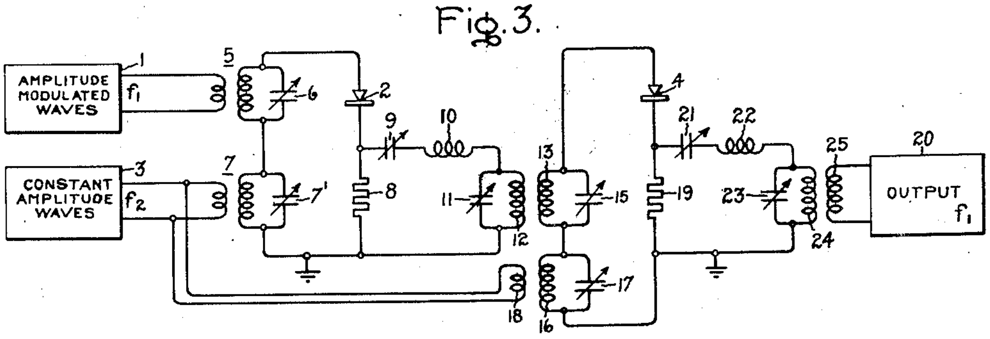
Figure 4:
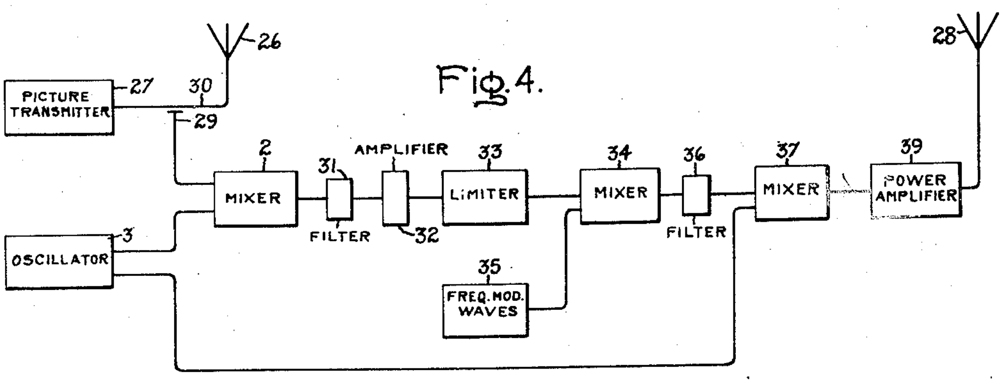
Figure 5:
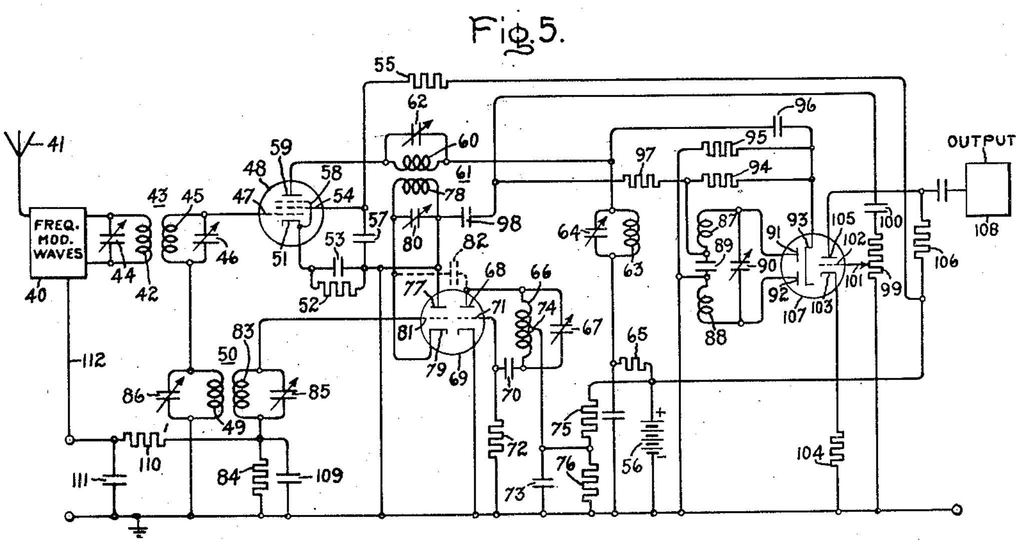
Figure 6:
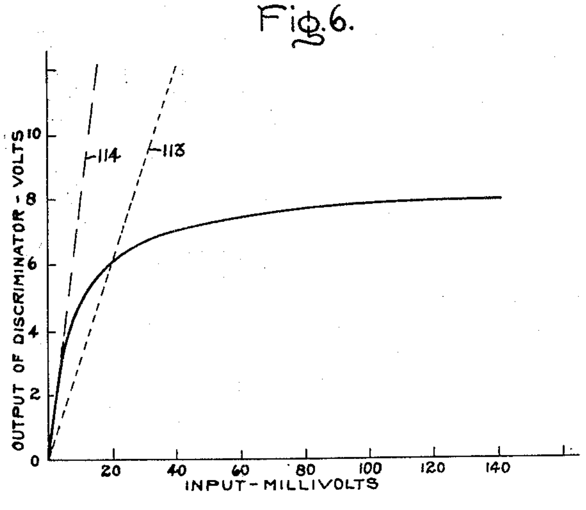

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 is a block diagram illustrating certain fundamental principles of my improved wave conversion system; Fig. 2 is a circuit diagram illustrating the basic features of my improved limiter circuit; Fig. 3 is a circuit diagram of the wave conversion system of Fig. 1; Fig. 4 is a block diagram of a television transmitter employing my invention; Fig. 5 is a circuit diagram of a frequency modulation receiver constructed in accordance with my invention; and Fig. 6 is a graph illustrating the amplitude suppression characteristic of the receiver of Fig. 5.

Referring to Fig. 1, the block labelled 1 represents a source of amplitude modulated high frequency waves of the frequency $f_1$ which are supplied to a linear detector or mixer 2. Likewise supplied to the mixer 2 are unmodulated oscillations of the frequency $f_2$ obtained from a source 3. For reasons which are pointed out later, the amplitude of the unmodulated oscillations provided by the source 3 is considerably smaller than the lowest level reached by the amplitude modulated wave from the source 1 in its negative or inward portion of the modulation cycle. The linear detector 2 combines the waves $f_1$ and the oscillations $f_2$ to provide in its output a difference frequency wave $f_2-f_1$ which is of a substantially constant amplitude. The waves in the output of the detector or mixer 2 are combined in a second mixer 4 with waves or oscillations from the source 3 to provide, from its output, waves of a frequency $f_1$ which are substantially constant in amplitude.

The reduction in amplitude modulation obtained by the mixing action in the linear detector 2 may be shown mathematically as follows:

Let $$e_1=E_1(1+m\cos\mu t)\cos\omega_1 t \qquad (1)$$

$$e_2=E_2\cos\omega_2 t \qquad (2)$$

where $\omega_1=2\pi f_1$
$\omega_2=2\pi f_2$
$\mu=2\pi f_a$ (modulation freq.)
$m$=modulation factor The input to linear detector 2 is the sum of Equations 1 and 2. The equation of the envelope may best be explained by writing Equation 2 in terms of $\omega_1$, using the conversion equation $$\omega_2=\omega_1+\rho \qquad (3)$$

where $\rho=2\pi f_0$ and $f_0$=beat frequency between $f_2$ and $f_1$. Thus Equation 2 becomes $$e_2=E_2\cos(\omega_1+\rho)t \qquad (4)$$

By trigonometric substitution, Equation 4 becomes $$e_2=E_2\cos\omega_1 t\cos\rho t-E_2\sin\omega_1 t\sin\rho t \qquad (5)$$

Thus the detected envelope is the square root of the sum of the squares of the combined cos $\omega_1 t$ coefficient and the sin $\omega_1 t$ coefficient, or $$e_d=\sqrt{[E_1(1+m\cos\mu t)+E_2\cos\rho t]^2+E_2^2\sin^2\rho t} \qquad (6)$$

When expanded Equation 6 becomes $$e_d=\sqrt{E_1^2(1+m\cos\mu t)^2+E_2^2}\left[1+\frac{E_1E_2\cos\rho t\,(1+m\cos\mu t)}{E_1^2\,(1+m\cos\mu t)^2+E_2^2}+\cdots\right] \qquad (7)$$

If the output circuit of the detector 2 is tuned to the frequency $f_0$, all terms of Equation 7 may be neglected except those containing cos $\rho t$. Thus, the net value of $e_d$ becomes $$ed=\left[\frac{E_1E_2(1+m\cos\mu t)}{\sqrt{E_1^2(1+m\cos\mu t)^2+E_2^2}}\right]\cos\rho t \qquad (8)$$

As previously pointed out, $e_2$ is much less than the minimum value of $e_1$ so that a substantial decrease in modulation results. For example, if $e_2$ is negligible in comparison with $(1-m)E_1$, the $E_2$ may be neglected in the denominator of Equation 8 so that the equation becomes simply $$e_d=E_2\cos\rho t \qquad (9)$$

so that, under such conditions, the output of the mixer 2 is entirely free of the modulation wave cos $\mu t$.

Ordinarily, $E_2$ is not of negligible value, but may be, for example, 10% of the minimum value of $(1-m)E_1$. Equation 8, at the time cos $\mu t=-1$, is $$e_d=\left[\frac{E_2(10E_2)}{\sqrt{(10E_2)^2+E_2^2}}\right]\cos\rho t$$

$$=\frac{10E_2}{\sqrt{100+1}}\cos\rho t$$

$$=\frac{E_2}{\sqrt{1.01}}\cos\rho t=0.995E_2\cos\rho t \qquad (10)$$

The above specified 10% relationship between $E_2$ and $E_1$ may be obtained for example if $m$=.9 and $E_2$=0.01$E_1$. Thus, a 90% modulated wave is reduced by the system of Fig. 1 to a 0.5% modulated wave. Stated in other words, the amplitude modulation of the wave $f_1$ is reduced 180 times.

In Fig. 2, there is shown a schematic diagram of a simple circuit for accomplishing the results outlined in Fig. 1. In this circuit, the source 1 of amplitude modulated waves is coupled to a linear detector 2 shown as a crystal, such as a silicon or germanium crystal, by means of a transformer 5 having its primary winding connected to the source 1 and its secondary winding tuned by means of a variable capacitor 6 to the carrier frequency of the source 1. The source 3 of constant amplitude waves of the frequency $f_2$ is likewise coupled to the linear detector 2 by a transformer 7 whose secondary winding is tuned by means of a capacitor 7' to the frequency $f_2$. The secondary circuits of transformers 5 and 7 are shown connected in series between one electrode of crystal detector 2 and ground. A load resistor 8 is connected between the other electrode of the crystal and ground.

The desired beat frequency corresponding to the frequency $f_0$ discussed previously is selected from among the various detector products across load resistor 8 by means of a filter circuit. The filter circuit may comprise, for example, a series resonant circuit constituted by series connected capacitor 9 and inductance 10 tuned to the beat frequency $f_0$. The series resonant circuit is followed by a shunt resonant circuit comprising capacitor 11 and inductance 12, these reactive elements being tuned likewise to the beat frequency $f_0$. The inductance 12 may constitute the primary winding of a transformer having a secondary winding 13 which supplies waves of the beat frequency to a utilization circuit or device shown generally by the rectangle labelled 14.

In Fig. 3 I have shown a modification of the circuit of Fig. 2 in which substantially all amplitude modulation is removed from the amplitude modulated waves $f_1$. In the circuit of Fig. 3, elements corresponding to those of Fig. 2 have been designated by corresponding reference numerals. In this circuit arrangement, the secondary winding 13 is tuned by a capacitor 15 to the beat frequency $f_0$ and currents of this frequency are supplied to the linear detector 4 shown as a crystal similar to the crystal 2. Connected in series with the secondary winding 13 is a tuned circuit comprising inductance 16 and a tuning capacitor 17 which supplies, to the same electrode of crystal 4, waves of the frequency $f_2$. These waves are obtained through a primary winding 18 connected to the constant amplitude wave source 3 and coupled to the inductance 16. The opposite electrode of the crystal 4 is connected to ground through a load resistance 19 and to an output circuit 20 for utilizing unmodulated waves of the frequency $f_1$ through a frequency selective output circuit similar in form to that employed in conjunction with the detector 2. This frequency selective output circuit comprises the serially connected capacitance 21 and inductance 22 which are series resonant at the frequency $f_1$ and connected in series with the shunt resonant circuit comprising capacitance 23 and inductance 24, resonant likewise at the frequency $f_1$. A secondary winding 25 coupled to inductance 24 is utilized to supply currents of the frequency $f_1$ to the output circuit 20.

In the block diagram of Fig. 4, I have shown a television transmitter which utilizes a first antenna 26 for radiating a picture carrier wave modulated in amplitude by picture signals and which is supplied with such modulated waves from a picture transmitter 27. The transmitter likewise employs a second antenna 28 for radiating an audio carrier wave which is modulated in frequency by audio signals. As is well known, the average picture signal carrier wave and the average audio signal carrier wave are separated in frequency by a frequency difference fixed either by governmental regulation or by established practice in the television broadcasting field. Thus, for conventional "black and white" television transmitters, this frequency difference is 4.5 megacycles, while for color television transmitters the frequency difference may be of the order of 11 megacycles.

In the circuit of Fig. 4, a probe 29 is coupled to the transmission line 30 connected between the picture transmitter 27 and the antenna 26 to supply to the mixer 2 waves of the picture carrier frequency and modulated in amplitude with video signals. Such waves usually contain some undesired frequency modulation components which are likewise supplied to the mixer 2. Preferably, the picture carrier waves supplied to the antenna 26 are not 100% modulated, but may be modulated, for example, 80%. The oscillator 3 supplies to the mixer 2 unmodulated waves of any suitable frequency different from the frequency of a picture carrier wave. For reasons pointed out previously, the waves supplied to mixer 2 by the oscillator 3 have an amplitude which preferably is 10% or less of the minimum amplitude of the modulated picture carrier wave. The mixer or linear detector 2 combines the picture carrier wave with the oscillations from the source 3 to provide a beat frequency wave which is substantially free of amplitude modulations, but which retains the undesired frequency modulation components of the video modulated carrier wave.

This beat frequency wave is supplied through the frequency selective circuits of a filter 31 to an amplifier 32 and thence to an amplitude limiter 33 which removes any amplitude modulations remaining on the wave. The waves in the output of the limiter 33 are essentially free of all amplitude modulations and are supplied to a mixer 34 where they are combined with waves of the above-mentioned difference frequency modulated in frequency by audio signals. These latter waves, which are supplied from the source 35, have an average frequency of 4.5 megacycles in the case of a black and white television transmitter and which may be of the order of 11 megacycles in the case of a color television transmitter. Frequency modulated waves from source 35 are added, in the mixer 34, to the constant amplitude beat frequency waves to provide in the output thereof a wave having an average frequency equal to the beat frequency plus the difference frequency and which is modulated in frequency both by desired audio signals and the undesired frequency modulation components present in the output of the picture transmitter 27. The combined waves in the output of mixer 34 are transmitted through the frequency selective circuits of a filter 36 and supplied to a third mixer or linear detector 37. Preferably, the filters 31, 36 are of the combined series and shunt resonant type, such as shown by the elements 9—12 and 21—24 of the circuit of Fig. 3.

I provide for the antenna 28 a carrier wave modulated in frequency with audio signals by combining, in the mixer 37, constant amplitude oscillations from the oscillator 3 and the combined beat frequency waves and frequency modulated difference frequency waves provided through the action of mixer 34. It is apparent that the sum of the beat frequency in the output of mixer 2 and the frequency of the oscillator 3 is equal to the average frequency of the video carrier wave. The resultant wave in the output of mixer 37, therefore, has a frequency equal to that of the video carrier wave plus the frequency modulated waves 35. The wave at the output of mixer 37, therefore, has an average frequency which is equal to the desired audio signal carrier wave. This frequency modulated audio signal carrier wave is amplified in power amplifier 39 and supplied therefrom to the antenna 28.

In the operation of the transmitter of Fig. 4, it is apparent that the carrier wave transmitted by the antenna 28 contains not only desired frequency modulations corresponding to audio signals, but also frequency modulations in the same sense as those present on the carrier wave of the picture transmitter 27. In other words, the frequency difference between the average frequencies of the carrier waves transmitted by the antennas 26, 28 remains constant for all modulations of the video carrier wave. As a result, when the waves transmitted by the antennas 26, 28 are received in a television receiver, they may be heterodyned or beat together in the manner described in my above-mentioned copending application to obtain a difference frequency wave which is modulated in frequency only by desired audio signals and which does not contain the unwanted frequency modulations present on the video carrier wave.

In Fig. 5, I have shown the circuit of a frequency modulation receiver which includes a source of frequency modulated waves 40 obtained from the usual antenna 41. The source 40 may include the usual high frequency stages and, in a superheterodyne receiver, may include one or more stages of radio frequency amplification, a frequency conversion stage, and one or more stages of intermediate frequency amplification. Waves from the source 40 are supplied to the primary winding 42 of a transformer 43, the winding 42 being tuned by means of a capacitor 44 to resonate at a desired center frequency. In a superheterodyne receiver, this frequency may, for example, be 10.7 megacycles. The secondary winding 45 of transformer 43 is tuned to this center frequency by means of a capacitor 46 and has its high voltage terminal connected to the control electrode 47 of an electron discharge device 48. The low voltage terminal of secondary winding 45 is connected to ground through a secondary winding 49 of a transformer 50. The cathode 51 of electron discharge device 48 is connected to ground through a biasing resistor 52 by-passed by the usual capacitor 53. The device 48 preferably is provided with a screen electrode 54 which is connected through a resistance 55 to the positive terminal of a source of potential illustrated as the battery 56. The screen electrode 54 is by-passed to ground by a capacitor 57. The device 48 may likewise include a suppressor grid 58 which is directly connected to the cathode 51 or to ground as desired.

For reasons to be pointed out later, the anode 59 of device 48 is connected to the positive terminal of the battery 56 through a pair of tuned circuits. The first of these circuits, comprising primary winding 60 of a transformer 61 and a capacitor 62, is tuned to the intermediate frequency which, in the case described above, may be 10.7 megacycles. The second of the tuned circuits comprises a primary winding 63 and a tuning capacitor 64. The anode circuit may likewise include a decoupling or filter resistance 65.

The frequency modulated signals developed across the tuned circuit 60, 62 in the usual frequency modulation receiver include undesired amplitude modulation components which are caused by static disturbances and other types of noise. In accordance with my invention, these undesired amplitude modulations are removed from the frequency modulated waves by combining them in a linear detector with locally generated oscillations of relatively low level with respect to the intermediate frequency signals. The locally generated oscillations are developed in an oscillatory circuit which comprises an inductance 66 and a capacitance 67. The upper terminal of the oscillatory circuit is connected to the anode 68 of the right-hand triode section of an electron discharge device 69 illustrated as containing two triode sections in a single envelope. The opposite terminal of the inductance 66 is connected through a coupling capacitance 70 to the control electrode 71 of the right-hand triode section and to ground through capacitance 70 and a biasing resistance 72. The cathode of the right-hand triode section, which is directly connected to ground, is coupled to an intermediate point on the oscillatory circuit through bypass capacitance 73 connected to an intermediate point 74 on the inductance 66. Operating potentials for the oscillator are provided by connection to the common terminal of voltage dividing resistors 75, 76.

In order to provide a linear detector for mixing the locally generated oscillations and the intermediate frequency signals, the anode 77 of the left-hand triode section of device 69 is connected to ground and serves as a shield. One terminal of the secondary winding 78 of the transformer 61 is connected to ground and the other terminal is connected to cathode 79 of the left-hand triode section. The secondary winding 78 is tuned to the frequency of the intermediate frequency signals by means of a capacitor 80. The control electrode 81 of the left-hand section acts as the other electrode of the above-referred to linear detector.

The electrodes 79, 81 constitute a diode which, in accordance with my invention, operates as a frequency converter. One frequency supplied to this detector is the intermediate frequency wave developed across the secondary winding 78 and which is applied between the cathode 79 and ground. The right-hand or oscillator section of device 69 likewise provides excitation potentials to the diode 79, 81 by virtue of the capacity coupling between the adjacent electrode elements within the single envelope of the device 69. In case this tray coupling is insufficient to provide a strong enough oscillator voltage, low level voltages of the frequency of the oscillatory circuit may be applied to the diode elements 79, 81 either magnetically as by loosely coupling the inductance 66 to the winding 78, or capacitively by connecting between the anode 68 and the cathode 79 of the device 69, the small capacitor 82 shown in dotted line. In either event, for reasons pointed out above, the potential of the oscillator frequency which is supplied to the diode section of device 69 is of low level relative to the intermediate frequency voltage which is supplied to the electrodes 79, 81.

In order that the beat frequency provided through the above described frequency conversion action may not be harmonically related to the intermediate frequency wave, the oscillatory circuit elements 66, 67 in the case of a receiver having an intermediate frequency wave of 10.7 megacycles, preferably is tuned to a frequency of 6.7 megacycles, for example. By virtue of the linear detection action of the diode elements 79, 81, there is developed in the circuit of the control electrode 81 a difference frequency wave which is free of amplitude modulations appearing in the intermediate frequency wave. This is by virtue of the amplitude modulation suppression action which is effected in the frequency conversion produced by the linear detector elements 79, 81. The control electrode 81 is connected to ground through the primary winding 83 of the transformer 50 and a load resistance 84. The primary winding 83 is tuned by means of a capacitor 85 to resonate at the beat frequency produced through the action of the diode 79, 81. In the case described, where the intermediate frequency wave has a frequency of 10.7 megacycles and the local oscillations have a frequency of 6.7 megacycles, the circuit elements 83, 85 are tuned to a frequency of 4.0 megacycles. The secondary winding 49 of transformer 50 is likewise tuned by capacitor 86 to the beat frequency of 4.0 megacycles and is connected to the control electrode 47 of amplifier 48.

As pointed out previously, the anode circuit of the device 48 includes a second tuned circuit comprising inductance 63 and capacitor 64. This circuit is tuned to the beat frequency developed through the conversion action of diode 79, 81. As a result, waves of this frequency, which are amplified in the device 48, are developed across the tuned circuit 63, 64. Furthermore, through the amplitude suppression action of the diode 79, 81, it is apparent that the beat frequency voltages developed across the circuit 63, 64 are limited in amplitude.

The inductance 63 may comprise the primary winding of the usual discriminator transformer having secondary windings 87, 88 whose adjacent terminals are connected together through a series capacitor 89 and which are resonated by a shunt capacitor 90. The outer terminals of the secondary windings 87, 88 are connected to the anodes 91, 92 of the usual discriminator diodes shown as having a common cathode 93 connected respectively through resistances 94, 95 to the inner terminals of windings 87, 88. The cathode 93 is likewise coupled through a capacitor 96 to primary winding 63. Audio frequency voltages corresponding to the frequency modulations appearing on the intermediate frequency wave and which are retained by the beat frequency wave in the conversion operation effected by the linear detector elements 79, 81, are developed across resistances 94 and 95. A radio frequency filtering resistance 97 has one terminal connected to the resistance 94 and its opposite terminal coupled to ground through a high frequency by-pass capacitor 98. A volume control or potentiometer circuit is connected across the capacitor 98 and comprises the resistor 99 coupled to capacitor 98 through a capacitor 100. The resistor 99 is provided with a variable tap 101 which is connected to the control electrode 102 of an audio amplifier illustrated as a triode having its cathode 103 connected to ground through a cathode resistor 104 and its anode 105 connected through a load resistance 106 to the positive terminal of the battery 56. The audio amplifier triode is illustrated as being included in the same envelope 107 with the diode elements 91—93. Amplified audio voltages may be supplied to any suitable output device or utilization circuit indicated conventionally by the rectangle 108. The utilization device 108 may include the usual power amplifier and loudspeaker or any similar device for translating audio current into audible energy.

In the operation of my frequency modulation receiver circuit, waves of intermediate frequency are developed across the windings of the transformer 61 and mixed in the diode 79, 81 with lower level oscillations generated in the oscillator elements 66—76 to produce a beat frequency wave which is substantially free of all undesired amplitude modulations which may be present on the intermediate frequency wave. The beat frequency waves are developed across the windings of transformer 50 and are amplified through the device 48 which operates as a reflex amplifier, amplifying at two distinct and fairly widely separated frequencies. The constant amplitude beat frequency waves are developed across the tuned circuit elements 63, 64, detected through the operation of the discriminator circuit, and amplified by the triode section of the device 107.

In order that the device 48 operate as a linear amplifier so as to produce no undesired distortions of the intermediate frequency waves, I provide means to restrict the amplitude of the intermediate frequency waves which are supplied to the control electrode 47. This means comprises a capacitor 109 connected across the resistor 84 to by-pass waves of intermediate frequency from the load resistor 84 and an automatic volume control circuit comprising a resistor 110 and a capacitor 111. The common terminal of the elements 110, 111 are connected by means of a conductor 112 to control electrodes of the preceding amplifier tubes of the source 40 to restrict in the usual manner the amplitude of the waves supplied to the control electrode 47. The elements 110, 111 function as a filter to prevent audio frequency variations accompanying the unidirectional voltage developed across load resistor 84 from appearing between the conductor 112 and ground. At the same time, the unidirectional component across load resistor 84 is not limited by the conversion action of the diode 79, 81, but increases with the strength of applied intermediate frequency signals to develop a voltage which may satisfactorily be employed for automatically controlling the amplitude of signals at the output of the preceding intermediate frequency amplifiers. Preferably, the time constant of the resistor 84 and capacitor 109 is relatively short so that the bias developed across resistor 84 follows quite faithfully the envelope of the intermediate frequency wave. At the same time, resistor 110 preferably is considerably larger than resistor 84 so that the A. C. and D. C. impedances across resistor 84 are substantially the same throughout the audio frequency range.

In the operation of the circuit of Fig. 5, I have found it desirable to provide a low unidirectional potential to the anode 68 of the local oscillator circuit in order that interference with the operation of other high frequency circuits is maintained at the lowest possible value. In this way, the level of the oscillator voltages which are introduced into the linear detector circuit is kept small relative to the level of the intermediate frequency voltages in that circuit.

In Fig. 6, I have shown the curve which illustrates the characteristics of my frequency modulation receiver to suppress amplitude modulations. In this curve, the intermediate frequency signal in millivolts applied to the control electrode 47 of the last intermediate frequency amplifier is plotted as abscissa against the output of the discriminator in volts as ordinate. It may be noted that amplitude suppression is obtained for any value of input on or over the knee of the characteristic curve for inputs greater than approximately 4 millivolts. When the signal input reaches approximately 20 millivolts, the characteristic has become sufficiently flat that its slope is only approximately 18% of the line 113 drawn through the origin. This difference in slopes indicates that a 30%-modulated wave at 10.7 megacycles becomes less than a 6%-modulated wave at 4 megacycles. The line 114 shows the slope which is ordinarily obtained when no suppression is effected. It may further be noted that the suppression in amplitude modulation increases rapidly and is approximately 26 decibels at an input signal of 100 millivolts.

An important advantage of my improved frequency modulation receiver circuit is that it provides a final intermediate frequency stage which requires a fraction only of the input level heretofore required to provide useful output. Thus, in my improved receiver circuit, the intermediate frequency stage requires only about $1/50$ volt input to obtain 15 decibels amplitude modulation suppression. At the same time, an input of $1/50$ volt results in an audio signal output of one volt, even when the intermediate frequency signal is frequency modulated only 33%.

Still another important advantage of my improved frequency modulation receiver is that, since the gain required in the radio and intermediate frequency stages is low compared to that heretofore required, substantially no regeneration of noise of the type present in the usual frequency modulation receiver is effected. As a result, my improved frequency modulation circuit likewise provides interchannel noise suppression in addition to removing undesired amplitude modulations of a received carrier wave.

While my invention has been described by reference to a particular embodiment thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent of the United States, is:

1. In combination, a source of amplitude modulated waves, a source of unmodulated oscillations having an amplitude smaller than the minimum amplitude of said waves, means for mixing said waves and said oscillations to produce a beat frequency wave of substantially constant amplitude, and means for mixing said beat frequency wave with a wave of substantially constant amplitude to produce a resultant wave of substantially constant amplitude and of a frequency differing from the frequency of said amplitude modulated wave by a constant frequency.

2. In combination, a source of amplitude modulated waves of a first frequency, a source of unmodulated oscillations of a second frequency having an amplitude smaller than the minimum amplitude of said waves, means for mixing said waves and said oscillations to produce a beat frequency wave of substantially constant amplitude, means for mixing said beat frequency with a wave of constant amplitude to produce a resultant wave of substantially constant amplitude and of a frequency differing from the frequency of said amplitude modulated waves by a constant frequency, and filtering means tuned to the frequency of said resultant wave connected to the output of said last mixing means.

3. In combination, a source of amplitude modulated waves of frequency $f_1$, a source of oscillations of frequency $f_2$ having a constant amplitude smaller than the minimum amplitude of said waves, means for mixing said waves and said oscillations to produce waves of a beat frequency $f_0$ and of substantially constant amplitude, means for selecting the waves of said beat frequency, and means for mixing said beat frequency waves and said oscillations to produce a wave of the frequency $f_1$ of said amplitude modulated waves and of substantially constant amplitude.

4. In combination, a source of amplitude modulated waves, a source of oscillations of constant amplitude smaller than the minimum amplitude of said waves, means for mixing said waves and said oscillations to produce a beat frequency wave of substantially constant amplitude, means for mixing said beat frequency wave and said oscillations to produce a wave having the frequency of said amplitude modulated waves and of substantially constant amplitude, and filtering means tuned to the frequency of said amplitude modulated waves connected to said last mixing means.

5. The combination, in a television transmitter, of means for producing a first carrier wave modulated in amplitude with desired video signals and in frequency with undesired modulations, means for producing a second carrier wave modulated with desired audio signals, and means for additionally modulating the frequency of said second carrier wave in accordance with said undesired modulations and in the same sense as said first carrier wave, thereby to reduce any variations in frequency between the mean frequencies of said waves.

6. In a television transmitter, the combination comprising means for producing a first carrier wave of a first frequency, means for modulating said wave in amplitude with desired video signals and in frequency with undesired modulations, means for producing a second carrier wave modulated in frequency with audio signals, and means for additionally modulating the frequency of said second carrier wave in accordance with said undesired modulations in the same sense and to the same extent as the undesired frequency modulation of said first carrier wave, thereby to maintain the average frequency of said second carrier wave separated in frequency from said first carrier wave by a constant frequency difference.

7. In a television transmitter, the combination comprising means for producing a first carrier wave modulated in amplitude with video signals and in frequency with undesired modulations, a source of unmodulated oscillations having an amplitude smaller than the minimum amplitude of said first carrier wave, means for combining said first carrier wave and said oscillations to produce a beat frequency wave of substantially constant amplitude, means for producing an additional wave modulated in frequency with audio signals, and means for combining said beat frequency wave and said additional wave to produce a second carrier wave modulated in frequency with both said audio signals and said undesired modulations.

8. In a television transmitter having means for producing a carrier wave modulated in amplitude with video signals and containing undesired frequency modulations, a source of unmodulated oscillations, means for mixing said modulated carrier wave and oscillations from said source to produce a beat frequency wave of substantially constant amplitude and containing said undesired frequency modulations, means for producing a wave modulated in frequency with audio signals, means for mixing said last wave and said beat frequency wave to provide a second beat frequency wave modulated in frequency with both said audio signals and said undesired modulations, and means for mixing said second beat frequency wave and said oscillations to produce a carrier wave modulated in frequency with audio signals and said undesired modulations.

9. In a television transmitter including means for producing a carrier wave modulated in amplitude with video signals and in frequency with undesired modulations, mixing means, means for supplying said carrier wave to said mixing means, means for supplying to said mixing means oscillations having a constant amplitude smaller than the minimum amplitude of said carrier wave to produce a first beat frequency wave of substantially constant amplitude and modulated in frequency with said undesired modulations, means for selecting waves of said beat frequency, means for producing a wave modulated in frequency by audio signals, means for mixing said last wave and said beat frequency wave to produce a second beat frequency wave modulated in frequency with both said audio signals and said undesired modulations, and means for mixing said second beat frequency wave and said oscillations to produce a carrier wave modulated in frequency with said audio signals and said undesired modulations, the average frequency of said audio signal carrier wave varying from said video carrier wave by a constant frequency difference.

10. A television transmitter for producing first and second carrier waves separated by a constant frequency difference comprising means for producing a first carrier wave modulated in amplitude with video signals and containing undesired frequency modulations, means for producing an unmodulated carrier wave of constant amplitude smaller than the minimum amplitude of said first wave, means for mixing said first wave and said unmodulated wave to obtain a heterodyne wave of constant amplitude and modulated in frequency with said undesired modulations, means for producing a wave modulated in frequency with audio signals, and means for mixing said last named wave and said heterodyne wave to obtain a second carrier wave modulated in frequency with both said audio signals and said undesired modulations.

11. A television transmitter for producing first and second carrier waves separated by a constant frequency difference comprising means for producing a first carrier wave modulated in amplitude with video signals and containing undesired frequency modulations, means for producing an unmodulated carrier wave of constant amplitude smaller than the minimum amplitude of said first wave, means for mixing said first wave and said unmodulated wave to obtain a first heterodyne wave of constant amplitude and modulated in frequency with said undesired modulations, means for producing a wave modulated in frequency with audio signals, means for mixing said last named wave and said first heterodyne wave to obtain a second heterodyne wave modulated in frequency with both said audio signals and said undesired modulations, and means for mixing said second heterodyne wave and said unmodulated carrier wave to obtain a second carrier wave modulated in frequency with both said audio signals and said undesired modulations.

ROBERT B. DOME.

REFERENCES CITED

The following references are of record in the file of this patent:

UNITED STATES PATENTS

| Number | Name | Date |
|---|---|---|
| 2,085,791 | Carlson | July 6, 1937 |
| 2,118,610 | Koch | May 24, 1938 |
| 2,200,753 | Linsell | May 14, 1940 |
| 2,201,309 | Goldsmith | May 21, 1940 |
| 2,214,929 | Koschmieder | Sept. 17, 1940 |
| 2,227,108 | Roosenstein | Dec. 31, 1940 |
| 2,283,575 | Van Roberts | May 19, 1942 |
| 2,326,515 | Bartelink | Aug. 10, 1943 |
| 2,344,813 | Goldstine | Mar. 21, 1944 |
| 2,363,288 | Bell | Nov. 21, 1944 |
| 2,383,359 | Zeigler | Aug. 21, 1945 |
| 2,401,384 | Young | June 4, 1946 |
| 2,405,765 | Smith | Aug. 13, 1946 |
| 2,407,213 | Tunick | Sept. 3, 1946 |
| 2,448,908 | Parker | Sept. 7, 1948 |

OTHER REFERENCES

Radio Engineers Handbook by Terman, 1943 (pages 567, 568. Copy in Div. 16.).

Complete Index to Riders Television Manual (vol. 2, pages 11, 12 and 24, 1949. Copy Div. 16.).